US011516656B2

(12) United States Patent
Inaba

(10) Patent No.: US 11,516,656 B2
(45) Date of Patent: Nov. 29, 2022

(54) TERMINAL DEVICE, TRANSMISSION DEVICE, DATA TRANSMISSION SYSTEM, AND DATA RECEPTION METHOD FOR RECEIVING SIGNALS TRANSMITTED FROM TRANSMISSION DEVICES MOUNTED ON A TRAIN

(71) Applicant: Mitsubishi Electric Corporation, Tokyo (JP)

(72) Inventor: Yukitoshi Inaba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 323 days.

(21) Appl. No.: 16/639,005

(22) PCT Filed: Sep. 13, 2017

(86) PCT No.: PCT/JP2017/032955
§ 371 (c)(1),
(2) Date: Feb. 13, 2020

(87) PCT Pub. No.: WO2019/053796
PCT Pub. Date: Mar. 21, 2019

(65) Prior Publication Data
US 2020/0204987 A1 Jun. 25, 2020

(51) Int. Cl.
*H04W 12/00* (2021.01)
*H04L 9/08* (2006.01)
(Continued)

(52) U.S. Cl.
CPC ....... *H04W 12/037* (2021.01); *B61L 15/0027* (2013.01); *H04B 17/318* (2015.01);
(Continued)

(58) Field of Classification Search
CPC ... H04W 12/037; H04W 84/10; H04W 48/12; H04W 12/03; H04W 12/122;
(Continued)

(56) References Cited

U.S. PATENT DOCUMENTS

2018/0373882 A1* 12/2018 Veugen .................. H04L 9/008

FOREIGN PATENT DOCUMENTS

JP 2006054558 A 2/2006
WO WO-2016043389 A1 * 3/2016 ............ H04W 12/08

OTHER PUBLICATIONS

International Search Report (PCT/ISA/210) dated Dec. 5, 2017, by the Japan Patent Office as the International Searching Authority for International Application No. PCT/JP2017/032955.
(Continued)

*Primary Examiner* — Quazi Farooqui
(74) *Attorney, Agent, or Firm* — Buchanan Ingersoll & Rooney PC

(57) ABSTRACT

A terminal device includes a signal reception unit that receives signals transmitted from a plurality of transmission devices, and analyzes the contents of data contained in the signals; and a control unit that performs control to select one transmission device from the plurality of transmission devices that have transmitted signals containing identical data, and causes the signal reception unit to continuously receive a signal being transmitted from the selected transmission device when the number of received signals containing identical data is equal to or larger than a prescribed number.

17 Claims, 5 Drawing Sheets

(51) Int. Cl.
  *H04B 17/318* (2015.01)
  *B61L 15/00* (2006.01)
  *H04W 12/037* (2021.01)
  *G06Q 50/30* (2012.01)
  *H04W 84/10* (2009.01)

(52) U.S. Cl.
  CPC ........... *H04L 9/0869* (2013.01); *G06Q 50/30* (2013.01); *H04W 84/10* (2013.01)

(58) Field of Classification Search
  CPC ... H04W 48/20; H04W 84/005; H04W 12/00; B61L 15/0027; B61L 15/0072; B61L 15/00; H04B 17/318; H04L 9/0869; H04L 63/1483; H04L 9/0819; H04L 9/08; G06Q 50/30
  See application file for complete search history.

(56) References Cited

OTHER PUBLICATIONS

Written Opinion (PCT/ISA/237) dated Dec. 5, 2017, by the Japan Patent Office as the International Searching Authority for International Application No. PCT/JP2017/032955.

\* cited by examiner

TERMINAL DEVICE, TRANSMISSION DEVICE, DATA TRANSMISSION SYSTEM, AND DATA RECEPTION METHOD FOR RECEIVING SIGNALS TRANSMITTED FROM TRANSMISSION DEVICES MOUNTED ON A TRAIN

FIELD

The present invention relates to a terminal device, a transmission device, a data transmission system, and a data reception method for receiving signals transmitted from transmission devices mounted in a train.

BACKGROUND

There have been systems in which a transmission device mounted in a train delivers content to a terminal device in the train. Patent Literature 1 discloses a technique by which a transmission device delivers content such as news and a map around a station to a terminal device by a communication method using Bluetooth (registered trademark).

CITATION LIST

Patent Literature

Patent Literature 1: Japanese Patent Application Laid-open No. 2006-54558

SUMMARY

Technical Problem

By the above conventional technique, a plurality of transmission devices are mounted in a train car, and, further, a large number of transmission devices deliver content in a train formed with a plurality of cars that are connected. In such a case, a terminal device selects the transmission device delivering content with the highest received signal strength, and receives the content. However, in a case where a transmission device being operated by an attacker is delivering false content at a position closer to the terminal device than to the transmission devices mounted in the car, the terminal device selects the transmission device of the attacker, and receives the false content. Therefore, there is a possibility that the terminal device will suffer damage such as a spoofing attack and a replay attack made by an attacker.

The present invention has been made in view of the above, and aims to obtain a terminal device that can select and receive a desired signal in any signal reception state.

Solution to Problem

In order to solve the above-described problems and achieve the object, a terminal device according to the present invention includes: a signal reception unit to receive signals transmitted from a plurality of transmission devices, and analyze contents of data contained in the signals; and a control unit to perform control to select one transmission device from the plurality of transmission devices that have transmitted signals containing identical data, and cause the signal reception unit to continuously receive a signal being transmitted from the selected transmission device, when a number of received signals containing identical data is equal to or larger than a prescribed number.

Advantageous Effects of Invention

According to the present invention, a terminal device can effectively select and receive a desired signal in any signal reception state.

DESCRIPTION OF EMBODIMENTS

The following is a detailed description of a terminal device, a transmission device, a data transmission system, and a data reception method according to an embodiment of the present invention, with reference to the drawings. Note that the present invention is not limited by this embodiment.

Embodiment

Figure 1:
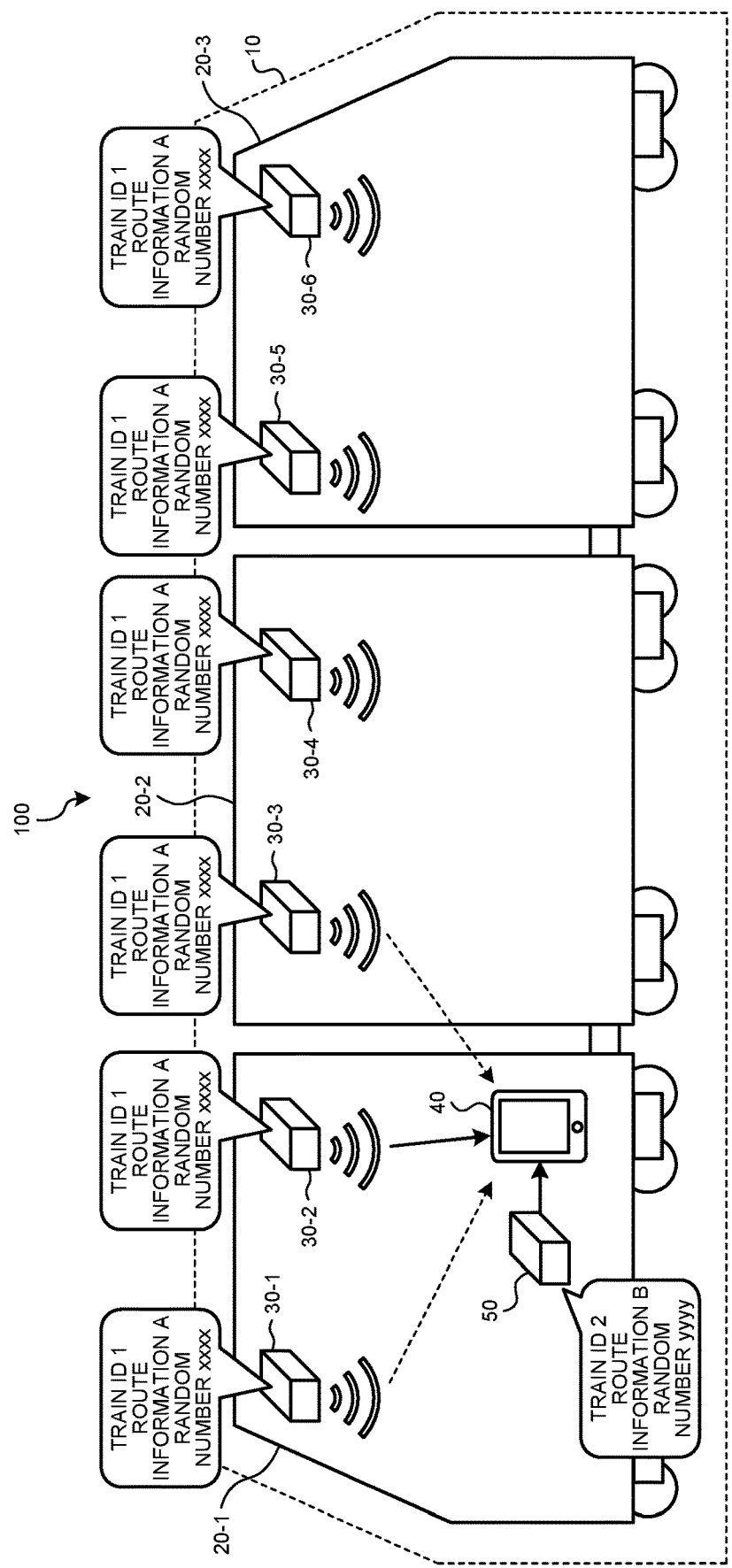
FIG. 1 is a diagram illustrating an example configuration of a data transmission system.

FIG. 1 is a diagram illustrating an example configuration of a data transmission system 100 according to an embodiment of the present invention. The data transmission system 100 includes a train 10 and a terminal device 40. The train 10 includes cars 20-1 through 20-3. The car 20-1 includes transmission devices 30-1 and 30-2. The car 20-2 includes transmission devices 30-3 and 30-4. The car 20-3 includes transmission devices 30-5 and 30-6. The transmission devices 30-1 through 30-6 are beacon devices, for example. The terminal device 40 is a terminal device carried by a user who is a passenger of the train 10. The communication method adopted between the transmission devices 30-1 through 30-6 and the terminal device 40 may be a method such as Bluetooth or Wi-Fi (registered trademark), but are not limited to these methods. In the description below, a case where a Bluetooth communication method is adopted will be specifically explained. Further, in the description below, the cars 20-1 through 20-3 will also be referred to as the cars 20 when not distinguished from one another, and the transmission devices 30-1 through 30-6 will also be referred to as the transmission devices 30 when not distinguished from one another.

The data transmission system 100 is a system in which the transmission devices 30-1 through 30-6 mounted in the train 10 transmit beacon signals containing data to the terminal device 40, and the terminal device 40 continuously receives beacon signals from a transmission device 30 selected from among the transmission devices 30-1 through 30-6. In the description below, a beacon signal will be simply referred to as a signal. The transmission devices 30-1 through 30-6 receive data distribution from a server (not illustrated) installed on the ground, and transmit data that is common among the transmission devices 30-1 through 30-6, or signals containing identical data. The communication method adopted between the server and the transmission devices 30-1 through 30-6 may be a method such as Wi-Fi, but is not limited to this. Note that the device that distribute data is not necessarily a server, but may be a passenger guidance control device, a car monitoring device, a base station installed along a railroad or in a station, or the like. The transmission devices 30-1 through 30-6 may receive data distribution directly from the above server or a base station, or may receive data distribution indirectly via another device such as a passenger guidance control device or a car monitoring device. The data to be transmitted by the transmission devices 30-1 through 30-6 may be route information relating to the train operation such as the destination and the arrival time of the train, the train identification (ID) for identifying the train, and the like. However, the data is not limited to these pieces of information. Some other information may be added to the data to be transmitted by the transmission devices 30-1 through 30-6. In FIG. 1, a server (not illustrated) distributes data of a train ID "1" and route information "A". The transmission devices 30-1 through 30-6 transmit signals containing identical data formed with the train ID "1" and the route information "A".

Here, it is assumed that a transmission device 50 being operated by a malicious attacker transmits a signal containing false data at a position closer to the terminal device 40 than to the transmission devices 30-1 through 30-6 in the train 10. The false data is different data from the data being transmitted by the transmission devices 30-1 through 30-6 described above, and is data containing a train ID "2" and route information "B" in the example in FIG. 1. In the data transmission system 100, even in a case where the received signal strength of a signal transmitted from the transmission device 50 is higher than the received signal strength of signals transmitted from the transmission devices 30-1 through 30-6, the terminal device 40 can select a transmission device 30 that transmits a desired signal, or a transmission device 30 from among the transmission devices 30-1 through 30-6. The desired signal is a signal to be transmitted by the transmission devices 30-1 through 30-6 mounted in the train 10. In the example in FIG. 1, the desired signal is a signal containing the data of the train ID "1" and the route information "A".

Figure 2:
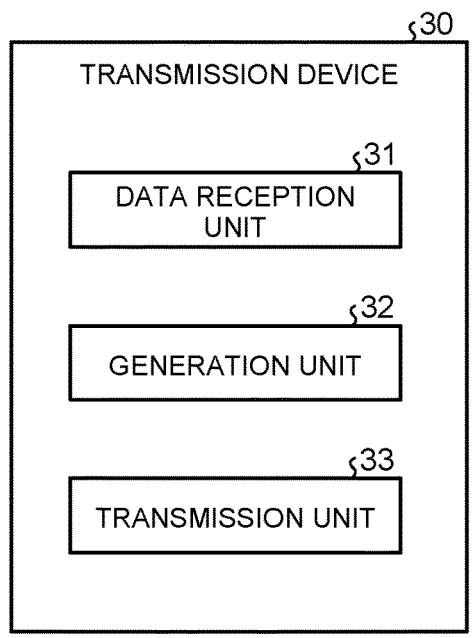
FIG. 2 is a block diagram illustrating an example configuration of a transmission device.

FIG. 2 is a block diagram illustrating an example configuration of a transmission device 30 according to the present embodiment. The transmission device 30 includes a data reception unit 31, a generation unit 32, and a transmission unit 33. The data reception unit 31 receives data distributed from the server (not illustrated). The generation unit 32 generates a random number in accordance with rules that are set in the transmission devices 30-1 through 30-6, and encrypts the data received by the data reception unit 31, using the random number. The generation unit 32 generates a signal containing the encrypted data and the random number. The transmission unit 33 transmits the signal generated by the generation unit 32 inside the car 20.

Figure 3:
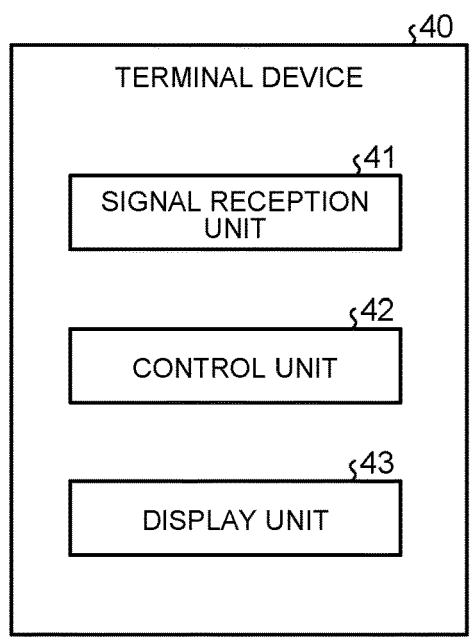
FIG. 3 is a block diagram illustrating an example configuration of a terminal device.

FIG. 3 is a block diagram illustrating an example configuration of the terminal device 40 according to the present embodiment. The terminal device 40 includes a signal reception unit 41, a control unit 42, and a display unit 43. The signal reception unit 41 receives signals transmitted from the plurality of transmission devices 30, and analyzes the contents of the data contained in the signals. Specifically, the signal reception unit 41 decrypts the encrypted data, using the code included in the signals. The signal reception unit 41 checks the contents of the data contained in the received signals, or the contents of the decrypted data. In a case where there are signals containing identical data, the signal reception unit 41 counts the number of received signals on the basis of identical data. In a case where the number of received signals containing identical data is equal to or larger than a prescribed number, the control unit 42 selects one transmission device 30 from the plurality of transmission devices 30 that have transmitted the signals containing the identical data. The control unit 42 performs control so that the signal reception unit 41 continuously receives signals transmitted from the selected transmission device 30. The display unit 43 displays the contents of the data contained in the signals that have been transmitted from the transmission device 30 selected by the control unit 42 and been received by the signal reception unit 41.

The terminal device 40 may be a dedicated device for displaying the data contained in signals transmitted from the transmission devices 30, or data provided by the railroad company that operates the train 10 equipped with the transmission devices 30. Alternatively, the terminal device 40 may be a device such as a smartphone in which an application that is distributed by the railroad company and is designed to display data is installed. A user who wishes to receive a data display service being provided by the railroad company acquires a dedicated device, or installs the above application beforehand into a device such as a smartphone.

Next, an operation in which the transmission devices 30-1 through 30-6 transmit signals, and the terminal device 40 selects one transmission device 30 to continuously receive signals will be described.

Figure 4:
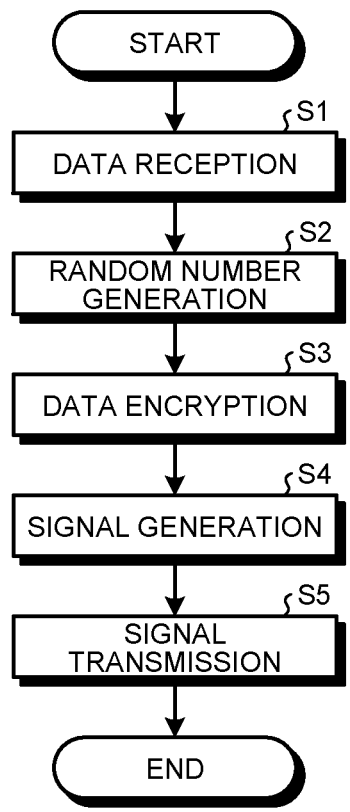
FIG. 4 is a flowchart illustrating operation of the transmission device.

FIG. 4 is a flowchart showing an operation of a transmission device 30 according to the present embodiment. Note that, in the train 10, the transmission devices 30-1 through 30-6 each perform the same operation. First, in the transmission device 30, the data reception unit 31 receives data distributed from the server (step S1).

The generation unit 32 generates a random number every time data is received by the data reception unit 31, in accordance with the rules that are in the transmission devices 30-1 through 30-6 (step S2). As for the values of random numbers generated by the respective generation units 32 of the transmission devices 30-1 through 30-6, the values of random numbers generated at a time are identical, but a random number value is different every time a random number is generated. That is, the respective generation units 32 of the transmission devices 30-1 through 30-6 change the value of the random number to be generated in cooperation with one another. FIG. 1 illustrates that the values of the random numbers generated by the respective generation units 32 of the transmission devices 30-1 through 30-6 at a time are identical, being "xxxx". When random numbers are next generated by the respective generation units 32 of the transmission devices 30-1 through 30-6, the random numbers have an identical value that is different from "xxxx".

Using the generated random number, the generation unit 32 encrypts the data received by the data reception unit 31 (step S3). The method of encrypting data using a random number may be a method of performing exclusive OR operation by multiplying data by a random number. However, the method may be any general method, and is not limited to any particular method. In the transmission device 30, the generation unit 32 encrypts the data, to prevent any third party from falsifying the data or the like.

The generation unit 32 generates a signal containing the encrypted data and the random number (step S4). In doing so, the generation unit 32 stores the data into a first area that can be analyzed by the terminal device 40 without pairing between the transmission device 30 and the terminal device 40, in the format of the signal to be generated. The generation unit 32 also stores the random number into a prescribed second area in the format of the signal to be generated. The first area is a vendor code area, for example, in a case where the communication method is the Bluetooth method as described above. However, the vendor code area is merely an example, and the first area is not limited to this. The second area is an area known to the transmission device 30 and the terminal device 40. The second area may be located in the first area. As for the method for the terminal device 40 to acquire information about the first area and the second area, the information about the first area and the second area is stored beforehand in a case where the terminal device 40 is a dedicated device, and the information about the first area and the second area is contained in the above mentioned application in a case where the terminal device 40 is not a dedicated device. Thus, the terminal device 40 can use the encrypted data stored in the first area, and the random number stored in the second area. Note that the generation unit 32 may add a checksum to the signal to be generated.

The transmission unit 33 transmits the signal generated by the generation unit 32 inside the car 20 (step S5). The signals to be transmitted simultaneously by the respective transmission units 33 of the transmission devices 30-1 through 30-6 are identical signals. Specifically, at a certain point of time shown in the example illustrated in FIG. 1, the respective transmission units 33 of the transmission devices 30-1 through 30-6 simultaneously transmit signals containing data generated by encrypting the data of the train ID "1" and the route information "A" with the random number "xxxx". The transmission device 30 repeatedly performs the operation illustrated in FIG. 4 while the train 10 is operating, regardless of whether the terminal device 40 exists in the train 10.

Figure 5:
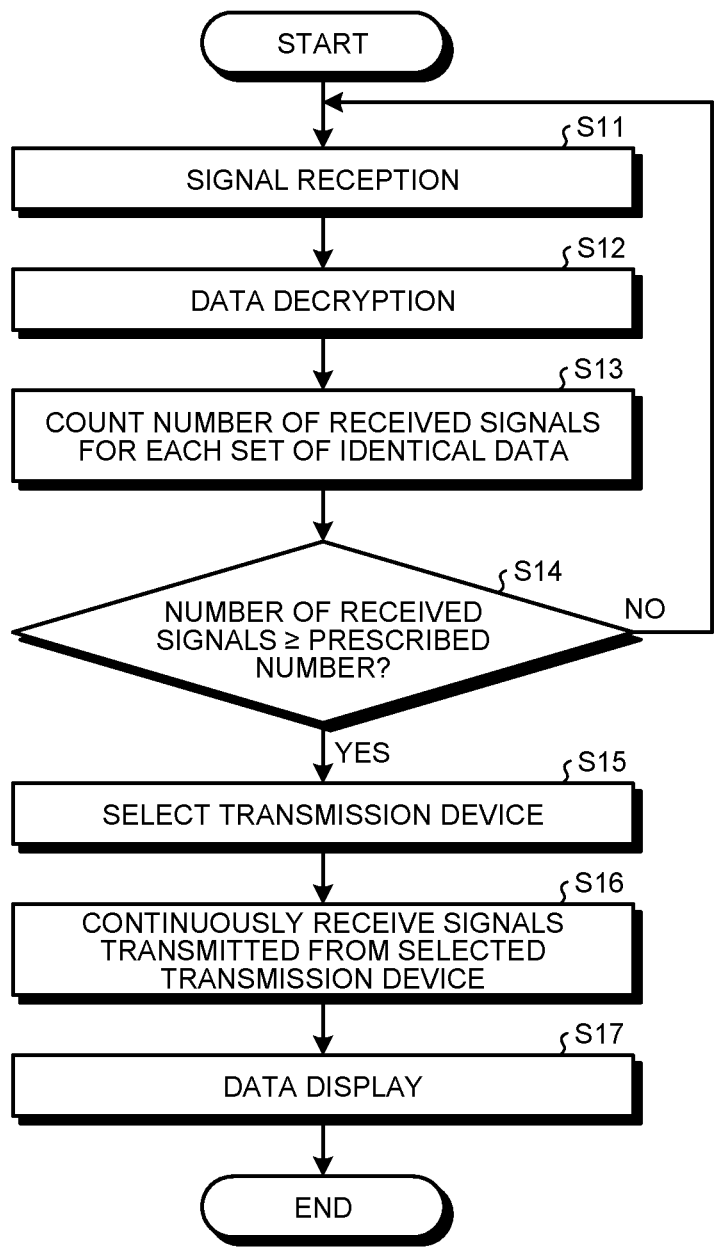
FIG. 5 is a flowchart illustrating operation of the terminal device.

FIG. 5 is a flowchart showing an operation of the terminal device 40 according to the present embodiment. First, in the terminal device 40, the signal reception unit 41 receives signals transmitted from the plurality of transmission devices 30 and the transmission device 50 (step S11). As illustrated in FIG. 1, the transmission device 50 transmits a signal containing data obtained by encrypting the data of the train ID "2" and the route information "B" with a random number "yyyy".

Since the data contained in the received signals is encrypted, the signal reception unit 41 decrypts the encrypted data, using the random number contained together with the encrypted data in the signals (step S12). The signal reception unit 41 acquires the random number from the second area of each signal on the basis of the information about the second area, without performing pairing with any transmission device 30. Using the random number, the signal reception unit 41 decrypts the data stored in the first area. As the signal reception unit 41 can decrypt data without performing pairing, the processing load can be made lower than in a case where pairing is performed.

The signal reception unit 41 checks the contents of the decrypted data, and, if there are signals containing identical data, counts the number of received signals for each set of identical data (step S13). In other words, the signal reception unit 41 counts the number of transmission devices 30 from which the signal reception unit 41 has received signals, among the transmission devices 30-1 through 30-6 that have simultaneously transmitted identical signals.

The control unit 42 checks the data contained in the signals received by the signal reception unit 41, and checks whether the number of sets of identical data, or the number of received signals containing identical data, is equal to or larger than a prescribed number (step S14). The prescribed number is a value that is set by the railroad company or the like, depending on the number of transmission devices 30 mounted in a car 20 and the number of cars 20 connected in the train 10. As for the prescribed number, like the information about the first area and the second area, information about the prescribed number is stored beforehand in a case where the terminal device 40 is a dedicated device, and the information about the prescribed number is contained in the above mentioned application in a case where the terminal device 40 is not a dedicated device.

If the number of received signals containing identical data is smaller than the prescribed number (step S14: No), the terminal device 40 returns to step S11, and performs the above described operation. Although the transmission devices 30-1 through 30-6 simultaneously transmit signals containing identical data, the distances between the terminal device 40 and the respective transmission devices 30 vary, and therefore, the timing of signal reception from the respective transmission devices 30 might vary in the terminal device 40. As an example, the specified number is "3". The signal reception unit 41 repeats the operation from step S11 to step S13, to receive signals from the transmission devices 30-1, 30-2, and 30-3, and the transmission device 50, as illustrated in FIG. 1.

If the number of received signals containing identical data is equal to or larger than the prescribed number (step S14: Yes), the control unit 42 selects the one transmission device 30 that has transmitted the signal having the highest received signal strength from the plurality of transmission devices 30-1 through 30-3 that have transmitted the signals containing the identical data, on the basis of the received signal strengths of the plurality of signals containing the identical data (step S15). As illustrated in FIG. 1, the control unit 42 selects the transmission device 30-2 closest to the terminal device 40. In other words, the control unit 42 can select one transmission device 30 having a preferred signal reception state from among the transmission devices 30-1 through 30-3 that transmit desired signals. Note that, even if the signal received from the transmission device 50 has a higher received signal strength than that of the signals received from the transmission devices 30-1 through 30-3, the terminal device 40 does not receive the prescribed number of signals containing data identical to that of the transmission device 50. Therefore, in the control unit 42, the transmission device 50 that transmits a signal containing false data is not the selection target.

The control unit 42 performs control so that the signal reception unit 41 continuously receives signals transmitted from the selected transmission device 30-2. Although the transmission devices 30-1 through 30-6 transmit signals containing identical data, a different source address is contained in the signal from each transmission device 30. Thus, the control unit 42 can identify the transmission device 30-2, using the source address of the transmission device 30-2. The signal reception unit 41 continuously receives signals transmitted from the transmission device 30-2 selected by the control unit 42 (step S16).

The control unit 42 causes the display unit 43 to display the data generated by the signal reception unit 41 continuously receiving signals from the transmission device 30-2 and decrypting the signals (step S17). Note that the signal reception unit 41 discards the signals received from the transmission devices 30-1 and 30-3, which are not the selected transmission device 30-2, and the signal received from the transmission device 50, without decryption. By doing so, the signal reception unit 41 can reduce the processing load at the time of signal reception.

As described above, in a case where a plurality of signals is received, the terminal device 40 selects one transmission device 30 from the plurality of transmission devices 30 that have transmitted identical data, and displays the data contained in the signal received from the selected transmission device 30. The terminal device 40 continues to receive signals from the selected transmission device 30 while the user carrying the terminal device 40 is on the train 10 without changing cars 20. That is, in the flowchart illustrated in FIG. 5, the terminal device 40 performs the operation from step S11 to step S15 when the user gets on the train 10, and performs the processes in step S16 and step S17 after selecting a transmission device 30. Accordingly, even in a case where a signal containing false data is transmitted from the transmission device 50 located close to the transmission device 30-2, the terminal device 40 does not receive a plurality of sets of identical false data, and thus, does not select the transmission device 50 by mistake.

Further, the terminal device 40 can decrypt and display the data contained in a received signal without pairing with the transmission device 30. Accordingly, the processing load can be made lower than that in a case where paring is necessary.

Note that, in a case where the user carrying the terminal device 40 gets off the train 10, the communication between the terminal device 40 and the selected transmission device 30 is cut off. In this case, the terminal device 40 will perform the operation illustrated in FIG. 5 the next time the user gets on the train 10. Further, in a case where the user carrying the terminal device 40 changes cars 20, such as a case where the user moves from the car 20-1 to the car 20-2, for example, the communication between the terminal device 40 and the selected transmission device 30 is cut off, and therefore, the terminal device 40 performs the operation illustrated in FIG. 5 when the user moves to the vehicle 20-2.

Next, the hardware configuration of the terminal device 40 is described. The function to receive signals from the transmission devices 30 in the signal reception unit 41 is an interface circuit. The display unit 43 is a display such as a liquid crystal display (LCD). The other functions of the control unit 42 and the signal reception unit 41 are realized by a processing circuit. In other words, the terminal device 40 includes a processing circuit that can select a transmission device 30 that continuously receives signals, on the basis of received signals. The processing circuit may be formed with a processor that executes a program stored in a memory, and the memory, or may be formed with dedicated hardware.

Figure 6:
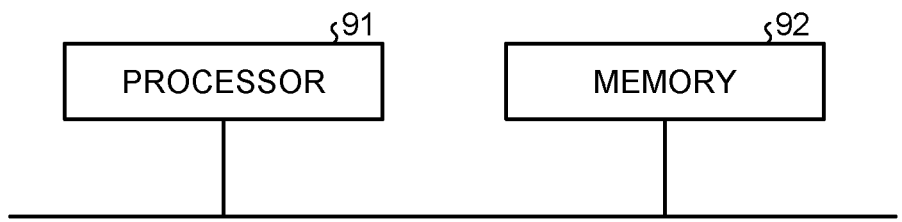
FIG. 6 is a diagram illustrating an example case where a processing circuit included in the terminal device is formed with a processor and a memory.

FIG. 6 is a diagram illustrating an example case where the processing circuit included in the terminal device 40 according to the present embodiment is formed with a processor and a memory. In a case where the processing circuit is formed with a processor 91 and a memory 92, the respective functions of the processing circuit of the terminal device 40 are achieved with software, firmware, or a combination of software and firmware. Software or firmware is written as programs, and is stored in the memory 92. In the processing circuit, the processor 91 reads and executes the programs stored in the memory 92, to achieve the respective functions. In other words, the processing circuit includes the memory 92 that stores a program for eventually selecting a transmission device 30 that continuously receives signals, on the basis of received signals. These programs can also be regarded as programs for causing a computer to carry out the procedures and the method of the terminal device 40.

Here, the processor 91 may be a central processing unit (CPU), a processing device, an arithmetic device, a microprocessor, a microcomputer, a digital signal processor (DSP), or the like. Meanwhile, the memory 92 may be a nonvolatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like, for example.

Figure 7:
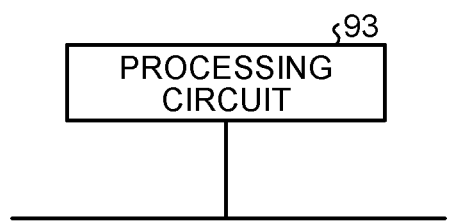
FIG. 7 is a diagram illustrating an example case where the processing circuit included in the terminal device is formed with dedicated hardware.

FIG. 7 is a diagram illustrating an example case where the processing circuit included in the terminal device 40 according to the present embodiment is formed with dedicated hardware. In a case where the processing circuit is formed with dedicated hardware, a processing circuit 93 illustrated in FIG. 7 can be a single circuit, a composite circuit, a programmed processor, a parallel-programmed processor, an application specific integrated circuit (ASIC), a field programmable gate array (FPGA), or a combination thereof, for example. The respective functions of the terminal device 40 may be achieved with the processing circuit 93 independently of one another, or the respective functions may be collectively achieved with the processing circuit 93.

Note that some of the functions of the terminal device 40 may be achieved with dedicated hardware, and the others may be achieved with software or firmware. In this manner, a processing circuit can achieve the above described functions with dedicated hardware, software, firmware, or a combination thereof.

Although the hardware configuration of the terminal device 40 has been described, the hardware configuration of a transmission device 30 is the same. In the data reception unit 31, the function to receive data from the server is an interface circuit. The transmission unit 33 is an interface circuit. The other functions of the generation unit 32 and the data reception unit 31 are realized by a processing circuit. This processing circuit may also be formed with the processor 91 that executes a program stored in the memory 92, and the memory 92 as illustrated in FIG. 6, or may be dedicated hardware as illustrated in FIG. 7.

As described above, according to the present embodiment, in the train 10, the plurality of transmission devices 30 transmits signals containing identical data. In a case where a prescribed number of signals containing identical data is received, or where signals containing identical data are received from the prescribed number of transmission devices 30, the terminal device 40 selects one transmission device 30 from among the transmission devices 30 that have transmitted the signals containing the identical data, and continuously receives signals being transmitted from the selected transmission device 30. Thus, even in a case where an attacker is transmitting a false signal in the vicinity, the terminal device 40 can receive desired signals, or select and receive signals transmitted from the transmission devices 30 mounted in the train 10 in any signal reception state.

The configuration described in the above embodiment is an example of the subject matter of the present invention, and can be combined with other known techniques, or may be partially omitted or modified without departing from the scope of the present invention.

Reference Signs List

10 train; 20-1 to 20-3 car; 30, 30-1 to 30-6, transmission device; 31 data reception unit; 32 generation unit; 33 transmission unit; 40 terminal device; 41 signal reception unit; 42 control unit; 43 display unit; 100 data transmission system.

The invention claimed is:

1. A terminal device comprising:
a signal reception circuitry to receive signals transmitted from a plurality of transmission devices, and analyze contents of data contained in the signals; and
a control circuitry to perform control to select one transmission device from the plurality of transmission devices that have transmitted signals containing identical data, and cause the signal reception circuitry to continuously receive a signal being transmitted from the selected transmission device, when a number of received signals containing identical data is equal to or larger than a prescribed number.

2. The terminal device according to claim 1, wherein the control circuitry selects a transmission device that has transmitted a signal having a high received signal strength, on a basis of received signal strengths of the plurality of signals containing the identical data.

3. The terminal device according to claim 1, wherein, when the data has been encrypted, the signal reception circuitry decrypts the encrypted data, using a random number contained together with the encrypted data in the signal.

4. The terminal device according to claim 3, wherein, when the encrypted data is stored in a first area in a format of the signal, the first area being analyzable by the signal reception circuitry without pairing between the transmission device and the terminal device, the signal reception circuitry decrypts the encrypted data, using the random number stored in a second area prescribed in the format of the signal.

5. The terminal device according to claim 1, wherein the signal reception circuitry discards signals received from the transmission devices other than the selected transmission device.

6. A data transmission system comprising:
a plurality of transmission devices to transmit signals to a terminal device, each transmission device comprising:
a data reception circuitry to receive distributed data;
a generation circuitry to generate a random number in accordance with a rule prescribed in the plurality of transmission devices, encrypt the data using the random number, and generate a signal containing the encrypted data and the random number, wherein the plurality of transmission devices are configured to generate the same random number at a given point in time; and
a transmission circuitry to transmit the signal.

7. The transmission system according to claim 6, wherein the generation circuitry stores the data into a first area in a format of the signal, and stores the random number into a second area prescribed in the format of the signal, the first area being analyzable by the terminal device without pairing between the transmission device and the terminal device.

8. A data transmission system comprising:
a plurality of transmission devices to transmit signals containing identical data; and
a terminal device to receive signals transmitted from the plurality of transmission devices, analyze contents of data contained in the signals, and, when a number of received signals containing identical data is equal to or larger than a prescribed number, perform control to select one transmission device from the plurality of transmission devices that have transmitted the signals containing the identical data and continuously receive a signal being transmitted from the selected transmission device.

9. The data transmission system according to claim 8, wherein
the terminal device selects a transmission device that has transmitted a signal having a high received signal strength, on a basis of received signal strengths of the plurality of signals containing the identical data.

10. The data transmission system according to claim 8, wherein
the plurality of transmission devices encrypts the data using a random number generated in accordance with a prescribed rule, and transmits signals containing the encrypted data and the random number, and
the terminal device decrypts the encrypted data, using the random number.

11. The data transmission system according to claim 10, wherein
the plurality of transmission devices stores the encrypted data into a first area and stores the random number into a prescribed second area in a format of the signal, the first area being analyzable by the terminal device without pairing between the transmission device and the terminal device, and
the terminal device decrypts the encrypted data, using the random number stored in the second area.

12. The data transmission system according to claim 8, wherein
the terminal device discards signals received from the transmission devices other than the selected transmission device.

13. A data reception method implemented in a terminal device in a data transmission system in which a plurality of transmission devices transmit signals to the terminal device, the data reception method comprising:
firstly receiving the signals transmitted from the plurality of transmission devices to analyze contents of data contained in the signals,
selecting one transmission device from a plurality of transmission devices that have transmitted signals containing identical data, when a number of received signals containing identical data is equal to or larger than a prescribed number; and
secondly receiving a signal transmitted from the selected transmission device on a continuing basis.

14. The data reception method according to claim 13, wherein,
in the selecting, a transmission device that has transmitted a signal having a high received signal strength is selected on a basis of received signal strengths of the plurality of signals containing the identical data.

15. The data reception method according to claim 13, wherein,
in the firstly receiving and the secondly receiving, when the data has been encrypted, the encrypted data is decrypted, using a random number contained together with the encrypted data in the signal.

16. The data reception method according to claim 15, wherein,
when the encrypted data is stored in a first area in a format of the signal, the first area being analyzable without pairing between the transmission device and the terminal device, in the firstly receiving and the secondly receiving, the encrypted data is decrypted, using the random number stored in a second area prescribed in the format of the signal.

17. The data reception method according to claim 13, wherein, in the secondly receiving, signals received from the transmission devices other than the selected transmission device are discarded.

* * * * *